United States Patent
Chen et al.

(10) Patent No.: US 8,942,194 B2
(45) Date of Patent: Jan. 27, 2015

(54) QOS-BASED POWER CONTROL IN AGGREGATED CARRIER COMMUNICATION SYSTEMS

(75) Inventors: Wanshi Chen, San Diego, CA (US); Juan Montojo, San Diego, CA (US); Peter Gaal, San Diego, CA (US); Xiliang Luo, San Diego, CA (US); Aleksandar Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 13/110,751

(22) Filed: May 18, 2011

(65) Prior Publication Data
US 2011/0286391 A1 Nov. 24, 2011

Related U.S. Application Data

(60) Provisional application No. 61/346,383, filed on May 19, 2010.

(51) Int. Cl.
*H04W 52/00* (2009.01)
*H04W 52/26* (2009.01)
(Continued)

(52) U.S. Cl.
CPC .......... *H04W 52/265* (2013.01); *H04W 52/08* (2013.01); *H04W 52/10* (2013.01); *H04W 52/346* (2013.01); *H04W 52/48* (2013.01); *H04W 52/34* (2013.01)
USPC ........ 370/329; 370/230.1; 370/231; 370/233; 455/522; 455/69

(58) Field of Classification Search
USPC .............. 370/230.1, 231, 232, 233, 234, 235, 370/395.21; 455/500, 522, 69, 103, 127.1
See application file for complete search history.

(56) References Cited

U.S. PATENT DOCUMENTS

| | | | |
|---|---|---|---|
| 2010/0056197 A1* | 3/2010 | Attar et al. ..................... | 455/522 |
| 2011/0249639 A1* | 10/2011 | Jen ................................. | 370/329 |
| 2012/0113831 A1* | 5/2012 | Pelletier et al. ............... | 370/252 |

FOREIGN PATENT DOCUMENTS

| EP | 2378819 A2 | 10/2011 |
|---|---|---|
| JP | 2012516608 A | 7/2012 |

(Continued)

OTHER PUBLICATIONS

3rd Generation Partnership Project; Technical Specification Group Radio Access Network; Evolved Universal Terrestrial Radio Access (E-UTRA); "Physical layer procedures," 3GPP TS 36.213 V8.6.0.*

(Continued)

*Primary Examiner* — Zewdu A Beyen
(74) *Attorney, Agent, or Firm* — Anthony R. Morris (57) ABSTRACT

A user equipment (UE) is configured for carrier aggregation in a wireless communication system. The UE selects control information to be transmitted in an uplink control channel format in a component carrier of two or more component carriers, where the control information includes information types associated with different information reliability requirements. The UE generates an open-loop power control parameter and/or a closed-loop power control parameter based on the information types. The UE transmits the control information in the uplink control channel format at a power level determined by the open-loop power control parameter and/or the closed-loop power control parameter.

12 Claims, 6 Drawing Sheets

(51) Int. Cl.
  *H04W 52/08* (2009.01)
  *H04W 52/10* (2009.01)
  *H04W 52/34* (2009.01)
  *H04W 52/48* (2009.01)

(56) References Cited

FOREIGN PATENT DOCUMENTS

| WO | 03039042 A1 | 5/2003 |
|---|---|---|
| WO | WO 2007024931 A2 * | 3/2007 |
| WO | 2010087623 A2 | 8/2010 |

OTHER PUBLICATIONS

CATT: "Remaining issue on PUCCH power control in LTE-A", 3GPP Draft; R1-111361, 3rd Generation Partnership Project (3GPP), Mobile Competence Centre ; 650, Route Des Luci0les ; F-06921 S0phia-Antip0lis Cedex ; France, vol. RAN WG1, No. Barcelona, Spain; 20110509, May 3, 2011, XP050491079, [retrieved on May 3, 2011].

Ericsson et al., "Power control for PUCCH format 3", 3GPP Draft; R1-105859, 3rd Generation Partnership Project (3GPP), Mobile Competence Centre ; 650, Route Des Luci0les ; F-06921 S0phia-Antip0lis Cedex ; France, vol. RAN WG1, No. Jacksonville, USA; 20101115, Nov. 9, 2010, XP050489423, [retrieved on Nov. 9, 2010].

Huawei: "Delta value for PUCCH power control", 3GPP Draft; R1-083046 Delta Value for PUCCH Power Control, 3rd Generation Partnership Project (3GPP), Mobile Competence Centre ; 650, Route Des Lucioles ; F-06921 Sophia Antipolis Cedex ; France, No. Jeju; 20080812, Aug. 12, 2008, XP050316493, [retrieved on Aug. 12, 2008].

International Search Report and Written Opinion—PCT/US2011/037227, ISA/EPO—Aug. 18, 2011.

3GPP RAN1: "3rd Generation Partnership Project; Technical Specification Group Radio Access Network; Evolved Universal Terrestrial Radio Access (E-UTRA) ; Physical layer procedures(Release 8)" 3GPP TS 36.213 V8.3.0, [Online] vol. 36.213, No. V8.3.0, May 1, 2008, pp. 1-45, XP002554705 Sophia Antipolis Retrieved from the Internet: URL:http://www.3gpp.org/ftp/Specs/archive/36-series/36.211/36213-830.zip> [retrieved on Nov. 9, 2009] p. 34, paragraph 8—p. 42, paragraph 9.1.2.

Samsung: "UL Transmission Power Control in LTE-A", 3GPP TSG-RAN WG1#58 R1-093395, Aug. 24, 2009.

\* cited by examiner

QOS-BASED POWER CONTROL IN AGGREGATED CARRIER COMMUNICATION SYSTEMS

RELATED APPLICATIONS

Claim of Priority Under 35 U.S.C. §119

The present application for patent claims priority to Provisional Application No. 61/346,383, entitled APPARATUS AND METHOD FOR DIFFERENT POWER CONTROL FOR THE SAME PUCCH FORMAT 2, filed May 19, 2010, assigned to the assignee hereof and hereby expressly incorporated by reference herein.

TECHNICAL FIELD

The present application relates generally to the field of wireless communications and, in particular, to systems and methods for controlling uplink transmit power based on quality of service requirements in aggregated carrier communication systems.

BACKGROUND

This section is intended to provide a background or context to the disclosed embodiments. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA), time division multiple access (TDMA), frequency division multiple access (FDMA), 3GPP Long Term Evolution (LTE), and orthogonal frequency division multiple access (OFDMA).

In a mobile wireless communication system, uplink (mobile station to base station) transmitter power control balances the need for sufficient energy transmitted per bit to achieve a desired quality-of-service (e.g., data rate and error rate), against the need to minimize interference to other users of the system and to maximize the battery life of the mobile terminal. To accomplish this goal, uplink power control has to adapt to the characteristics of the radio propagation channel, including path loss, shadowing, fast fading and interference from other users in the same cell and adjacent cells.

In LTE Rel-8, control signaling from a mobile station to a base station is carried on a physical uplink control channel (PUCCH) on a single carrier FDMA (frequency division multiple access) waveform. Control signaling includes scheduling requests (SR) for uplink transmissions, HARQ acknowledgments (ACK/NAK) for downlink data packets, channel quality indicators (CQI) and other information such as rank indicator (RI) and precoding matrix indicator (PMI) for downlink transmissions that indicate the modulation and coding scheme (MCS) that can be supported by the channel, taking into account the signal to noise plus interference ratio of the channel and the characteristics of the mobile station's receiver.

The control signaling on the PUCCH is transmitted in a frequency region on the edges of the system bandwidth. Each PUCCH transmission in one transmission subframe consists of one or more resource blocks (RB) at or near one edge of the system bandwidth in the first (0.5 millisecond) slot of the subframe, followed in the second (0.5 millisecond) slot of the subframe by a second set of resource blocks at or near the opposite edge of the system bandwidth.

LTE Rel-8 defines different PUCCH formats that carry different types and amounts of information including SR only, 1-bit and 2-bit HARQ ACK/NAK (corresponding to 1 codeword and 2 codeword transmissions), 11-bit CQI and 11-bit CQI with 1-bit and 2-bit HARQ ACK/NAK. The PUCCH power control algorithms in Rel-8 adjust power in proportion to the total number of HARQ bits and CQI bits, but the algorithms ignore the relative importance of HARQ bits and CQI bits and the 2 HARQ bits are inherently outweighed by the 11 CQI bits. The acceptable error rates for decoding HARQ ACK/NAK bits may be much lower than the acceptable error rate for decoding CQI bits, the reason being that a HARQ ACK/NAK decoding error (either a false positive or a false negative) may result in the acceptance of erroneous data or the rejection of accurate data.

Carrier aggregation (CA) has been proposed for LTE Advanced to aggregate two or more component carriers (CCs) per UE (e.g., up to five component carriers) to support wider transmission bandwidths for greater throughput. The PUCCH formats defined for LTE Rel-8 are inadequate to account for the number of HARQ ACK/NAK bits required for multiple component carriers (e.g., 5 carriers times 2 HARQ bits requires 10 bits). Additionally, as noted above, as the number of HARQ ACK/NAK bits increases relative to the number of CQI bits, the existing Rel-8 algorithms do not properly account for the weight of the HARQ ACK/NAK bits.

SUMMARY

Disclosed embodiments include methods, apparatus and articles of manufacture for selecting control information to be transmitted in an uplink control channel format in a component carrier of a plurality of component carriers, where the control information comprises information types associated with different information reliability requirements, generating at least one of an open-loop power control parameter and a closed-loop power control parameter based on the information types, and transmitting the control information in the uplink control channel format at a power level determined by at least one of the open-loop power control parameter and the closed-loop power control parameter.

These and other features of various embodiments, together with the organization and manner of operation thereof, will become apparent from the following detailed description when taken in conjunction with the accompanying drawings, in which like reference numerals are used to refer to like parts throughout.

DETAILED DESCRIPTION

In the following description, for purposes of explanation and not limitation, details and descriptions are set forth in order to provide a thorough understanding of the various disclosed embodiments. However, it will be apparent to those skilled in the art that the various embodiments may be practiced in other embodiments that depart from these details and descriptions.

As used herein, the terms "component," "module," "system" and the like are intended to refer to a computer-related entity, e.g., hardware, software/firmware, a combination of hardware and software, software in execution, etc. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, certain embodiments are described herein in connection with a user equipment (UE). A user equipment can also be called a user terminal, and may contain some or all of the functionality of a system, subscriber unit, subscriber station, mobile station, wireless terminal, mobile device, node, device, remote station, remote terminal, terminal, wireless communication device, wireless communication apparatus or user agent. A user equipment can be a cellular telephone, a cordless telephone, a Session Initiation Protocol (SIP) phone, a smart phone, a wireless local loop (WLL) station, a personal digital assistant (PDA), a laptop, a tablet, a netbook, a smart book, a handheld communication device, a handheld computing device, a satellite radio, a wireless modem card and/or another processing device for communicating over a wireless system. Moreover, various aspects are described herein in connection with a base station. A base station may be utilized for communicating with one or more wireless terminals and can also be called, and may contain some or all of the functionality of, an access point, node, Node B, evolved NodeB (eNB) or some other network entity. A base station communicates over the air-interface with UEs. The communication may take place through one or more sectors. The base station can act as a router between the UE and the rest of the access network, which can include an Internet Protocol (IP) network, by converting received air-interface frames to IP packets. The base station can also coordinate management of attributes for the air interface, and may also be the gateway between a wired network and the wireless network.

Various aspects, embodiments or features will be presented in terms of systems that may include a number of devices, components, modules, and the like. It is to be understood and appreciated that the various systems may include additional devices, components, modules, and so on, and/or may not include all of the devices, components, modules and so on, discussed in connection with the figures. A combination of these approaches may also be used.

Additionally, in the subject description, the word "exemplary" is used to mean serving as an example, instance or illustration. Any embodiment or design described herein as "exemplary" is not necessarily to be construed as preferred or advantageous over other embodiments or designs. Rather, use of the word exemplary is intended to present concepts in a concrete manner.

The various disclosed embodiments may be incorporated into a communication system. In one example, such communication system utilizes an orthogonal frequency division multiplex (OFDM) that effectively partitions the overall system bandwidth into multiple ($N_F$) subcarriers, which may also be referred to as frequency sub-channels, tones or frequency bins. For an OFDM system, the data to be transmitted (i.e., the information bits) is first encoded with a particular coding scheme to generate coded bits, and the coded bits are further grouped into multi-bit symbols that are then mapped to modulation symbols. Each modulation symbol corresponds to a point in a signal constellation defined by a particular modulation scheme (e.g., M-PSK or M-QAM) used for data transmission. At each time interval, which may be dependent on the bandwidth of each frequency subcarrier, a modulation symbol may be transmitted on each of the $N_F$ frequency subcarriers. Thus, OFDM may be used to combat inter-symbol interference (ISI) caused by frequency selective fading, which is characterized by different amounts of attenuation across the system bandwidth.

Generally, a wireless multiple-access communication system can simultaneously support communication for multiple wireless terminals. Each terminal communicates with one or more base stations through transmissions on the forward and reverse links. The forward link (or downlink) refers to the communication link from the base stations to the terminals, and the reverse link (or uplink) refers to the communication link from the terminals to the base stations. This communication link can be established through a single-in-single-out, multiple-in-single-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized. A MIMO system also supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the base station to extract transmit beamforming gain on the forward link when multiple antennas are available at the base station.

Figure 1:
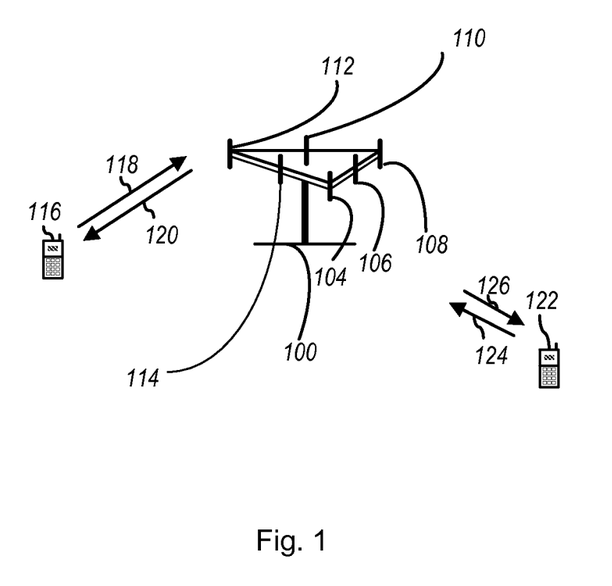
FIG. 1 illustrates a wireless communication system.

FIG. 1 illustrates a wireless communication system within which the various disclosed embodiments may be implemented. A base station 100 may include multiple antenna groups, and each antenna group may comprise one or more antennas. For example, if the base station 100 comprises six antennas, one antenna group may comprise a first antenna 104 and a second antenna 106, another antenna group may comprise a third antenna 108 and a fourth antenna 110, while a third group may comprise a fifth antenna 112 and a sixth antenna 114. It should be noted that while each of the above-noted antenna groups were identified as having two antennas, more or fewer antennas may be utilized in each antenna group.

Referring back to FIG. 1, a first user equipment 116 is illustrated to be in communication with, for example, the fifth antenna 112 and the sixth antenna 114 to enable the transmission of information to the first user equipment 116 over a first forward link 120, and the reception of information from the first user equipment 116 over a first reverse link 118. FIG. 1 also illustrates a second user equipment 122 that is in communication with, for example, the third antenna 108 and the fourth antenna 110 to enable the transmission of information to the second user equipment 122 over a second forward link 126, and the reception of information from the second user equipment 122 over a second reverse link 124. In a Frequency Division Duplex (FDD) system, the communication links 118, 120, 124 126 that are shown in FIG. 1 may use different frequencies for communication. For example, the first forward link 120 may use a different frequency than that used by the first reverse link 118.

In some embodiments, each group of antennas and/or the area in which they are designed to communicate is often referred to as a sector of the base station. For example, the different antenna groups that are depicted in FIG. 1 may be designed to communicate to the user equipment in a sector of the base station 100. In communication over the forward links 120 and 126, the transmitting antennas of the base station 100 utilize beamforming in order to improve the signal-to-noise ratio of the forward links for the different user equipment 116 and 122. Also, a base station that uses beamforming to transmit to user equipment scattered randomly throughout its coverage area causes less interference to user equipment in the neighboring cells than a base station that transmits omni-directionally through a single antenna to all its user equipment.

The communication networks that may accommodate some of the various disclosed embodiments may include logical channels that are classified into Control Channels and Traffic Channels. Logical control channels may include a broadcast control channel (BCCH), which is the downlink channel for broadcasting system control information, a paging control channel (PCCH), which is the downlink channel that transfers paging information, a multicast control channel (MCCH), which is a point-to-multipoint downlink channel used for transmitting multimedia broadcast and multicast service (MBMS) scheduling and control information for one or several multicast traffic channels (MTCHs). Generally, after establishing radio resource control (RRC) connection, MCCH is only used by the user equipments that receive MBMS. Dedicated control channel (DCCH) is another logical control channel that is a point-to-point bi-directional channel transmitting dedicated control information, such as user-specific control information used by the user equipment having an RRC connection. Common control channel (CCCH) is also a logical control channel that may be used for random access information. Logical traffic channels may comprise a dedicated traffic channel (DTCH), which is a point-to-point bi-directional channel dedicated to one user equipment for the transfer of user information. Also, a multicast traffic channel (MTCH) may be used for point-to-multipoint downlink transmission of traffic data.

The communication networks that accommodate some of the various embodiments may additionally include logical transport channels that are classified into downlink (DL) and uplink (UL). The DL transport channels may include a broadcast channel (BCH), a downlink shared data channel (DL-SDCH), a multicast channel (MCH) and a Paging Channel (PCH). The UL transport channels may include a random access channel (RACH), a request channel (REQCH), an uplink shared data channel (UL-SDCH) and a plurality of physical channels. The physical channels may also include a set of downlink and uplink channels.

In some disclosed embodiments, the downlink physical channels may include at least one of a common pilot channel (CPICH), a synchronization channel (SCH), a common control channel (CCCH), a shared downlink control channel (SDCCH), a multicast control channel (MCCH), a shared uplink assignment channel (SUACH), an acknowledgement channel (ACKCH), a downlink physical shared data channel (DL-PSDCH), an uplink power control channel (UPCCH), a paging indicator channel (PICH), a load indicator channel (LICH), a physical broadcast channel (PBCH), a physical control format indicator channel (PCFICH), a physical downlink control channel (PDCCH), a physical hybrid ARQ indicator channel (PHICH), a physical downlink shared channel (PDSCH) and a physical multicast channel (PMCH). The uplink physical channels may include at least one of a physical random access channel (PRACH), a channel quality indicator channel (CQICH), an acknowledgement channel (ACKCH), an antenna subset indicator channel (ASICH), a shared request channel (SREQCH), an uplink physical shared data channel (UL-PSDCH), a broadband pilot channel (BPICH), a physical uplink control channel (PUCCH) and a physical uplink shared channel (PUSCH).

Figure 2:
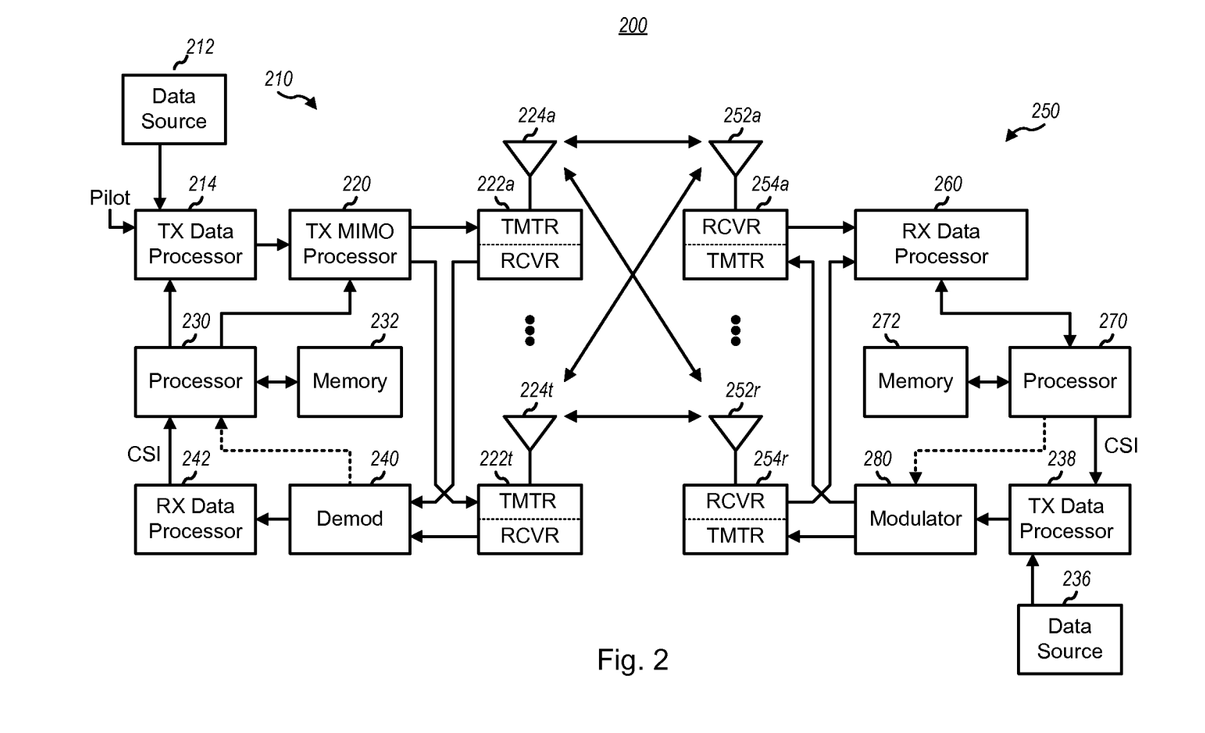
FIG. 2 illustrates a block diagram of an exemplary wireless communication system.

FIG. 2 illustrates a block diagram of an exemplary communication system that may accommodate the various embodiments. The MIMO communication system 200 that is depicted in FIG. 2 comprises a transmitter system 210 (e.g., a base station or access point) and a receiver system 250 (e.g., an access terminal or user equipment) in a MIMO communication system 200. It will be appreciated by one of ordinary skill that even though the base station is referred to as a transmitter system 210 and a user equipment is referred to as a receiver system 250, as illustrated, embodiments of these systems are capable of bi-directional communications. In that regard, the terms "transmitter system 210" and "receiver system 250" should not be used to imply single directional communications from either system. It should also be noted the transmitter system 210 and the receiver system 250 of FIG. 2 are each capable of communicating with a plurality of other receiver and transmitter systems that are not explicitly depicted in FIG. 2. At the transmitter system 210, traffic data for a number of data streams is provided from a data source 212 to a transmit (TX) data processor 214. Each data stream may be transmitted over a respective transmitter system. The TX data processor 214 formats, codes and interleaves the traffic data for each data stream, based on a particular coding scheme selected for that data stream, to provide the coded data.

The coded data for each data stream may be multiplexed with pilot data using, for example, OFDM techniques. The pilot data is typically a known data pattern that is processed in a known manner and may be used at the receiver system to estimate the channel response. The multiplexed pilot and coded data for each data stream is then modulated (symbol mapped) based on a particular modulation scheme (e.g., BPSK, QSPK, M-PSK or M-QAM) selected for that data stream to provide modulation symbols. The data rate, coding and modulation for each data stream may be determined by instructions performed by a processor 230 of the transmitter system 210.

In the exemplary block diagram of FIG. 2, the modulation symbols for all data streams may be provided to a TX MIMO processor 220, which can further process the modulation symbols (e.g., for OFDM). The TX MIMO processor 220 then provides $N_T$ modulation symbol streams to $N_T$ transmitter system transceivers (TMTR) 222a through 222t. In one embodiment, the TX MIMO processor 220 may further apply beamforming weights to the symbols of the data streams and to the antenna from which the symbol is being transmitted.

Each transmitter system transceiver 222a through 222t receives and processes a respective symbol stream to provide one or more analog signals, and further condition the analog signals to provide a modulated signal suitable for transmission over the MIMO channel. In some embodiments, the conditioning may include, but is not limited to, operations such as amplification, filtering, up-conversion and the like. The modulated signals produced by the transmitter system transceivers 222a through 222t are then transmitted from the transmitter system antennas 224a through 224t that are shown in FIG. 2.

At the receiver system 250, the transmitted modulated signals may be received by the receiver system antennas 252a through 252r, and the received signal from each of the receiver system antennas 252a through 252r is provided to a respective receiver system transceiver (RCVR) 254a through 254r. Each receiver system transceiver 254a through 254r conditions a respective received signal, digitizes the conditioned signal to provide samples and may further processes the samples to provide a corresponding "received" symbol stream. In some embodiments, the conditioning may include, but is not limited to, operations such as amplification, filtering, down-conversion and the like.

An RX data processor 260 then receives and processes the symbol streams from the receiver system transceivers 254a through 254r based on a particular receiver processing technique to provide a plurality of "detected" symbol streams. In one example, each detected symbol stream can include symbols that are estimates of the symbols transmitted for the corresponding data stream. The RX data processor 260 then, at least in part, demodulates, de-interleaves and decodes each detected symbol stream to recover the traffic data for the corresponding data stream. The processing by the RX data processor 260 may be complementary to that performed by the TX MIMO processor 220 and the TX data processor 214 at the transmitter system 210. The RX data processor 260 can additionally provide processed symbol streams to a data sink (not shown).

In some embodiments, a channel response estimate is generated by the RX data processor 260 and can be used to perform space/time processing at the receiver system 250, adjust power levels, change modulation rates or schemes, and/or other appropriate actions. Additionally, the RX data processor 260 can further estimate channel characteristics such as signal-to-noise (SNR) and signal-to-interference ratio (SIR) of the detected symbol streams. The RX data processor 260 can then provide estimated channel characteristics to a processor 270. In one example, the RX data processor 260 and/or the processor 270 of the receiver system 250 can further derive an estimate of the "operating" SNR for the system. The processor 270 of the receiver system 250 can also provide channel state information (CSI), which may include information regarding the communication link and/or the received data stream. This information, which may contain, for example, the operating SNR and other channel information, may be used by the transmitter system 210 (e.g., base station or eNodeB) to make proper decisions regarding, for example, the user equipment scheduling, MIMO settings, modulation and coding choices and the like. At the receiver system 250, the CSI that is produced by the processor 270 is processed by a TX data processor 238, modulated by a modulator 280, conditioned by the receiver system transceivers 254a through 254r and transmitted back to the transmitter system 210. In addition, a data source 236 at the receiver system 250 can provide additional data to be processed by the TX data processor 238.

In some embodiments, the processor 270 at the receiver system 250 may also periodically determine which pre-coding matrix to use. The processor 270 formulates a reverse link message comprising a matrix index portion and a rank value portion. The reverse link message may comprise various types of information regarding the communication link and/or the received data stream. The reverse link message is then processed by the TX data processor 238 at the receiver system 250, which may also receive traffic data for a number of data streams from the data source 236. The processed information is then modulated by a modulator 280, conditioned by one or more of the receiver system transceivers 254a through 254r, and transmitted back to the transmitter system 210.

In some embodiments of the MIMO communication system 200, the receiver system 250 is capable of receiving and processing spatially multiplexed signals. In these systems, spatial multiplexing occurs at the transmitter system 210 by multiplexing and transmitting different data streams on the transmitter system antennas 224a through 224t. This is in contrast to the use of transmit diversity schemes, where the same data stream is sent from multiple transmitter systems antennas 224a through 224t. In a MIMO communication system 200 capable of receiving and processing spatially multiplexed signals, a precode matrix is typically used at the transmitter system 210 to ensure the signals transmitted from each of the transmitter system antennas 224a through 224t are sufficiently decorrelated from each other. This decorrelation ensures that the composite signal arriving at any particular receiver system antenna 252a through 252r can be received and the individual data streams can be determined in the presence of signals carrying other data streams from other transmitter system antennas 224a through 224t.

Since the amount of cross-correlation between streams can be influenced by the environment, it is advantageous for the receiver system 250 to feed back information to the transmitter system 210 about the received signals. In these systems, both the transmitter system 210 and the receiver system 250 contain a codebook with a number of precoding matrices. Each of these precoding matrices can, in some instances, be related to an amount of cross-correlation experienced in the received signal. Since it is advantageous to send the index of a particular matrix rather than the values in the matrix, the feedback control signal sent from the receiver system 250 to the transmitter system 210 typically contains the index of a particular precoding matrix. In some instances the feedback control signal also includes a rank index which indicates to the transmitter system 210 how many independent data streams to use in spatial multiplexing.

Other embodiments of MIMO communication system 200 are configured to utilize transmit diversity schemes instead of the spatially multiplexed scheme described above. In these embodiments, the same data stream is transmitted across the transmitter system antennas 224a through 224t. In these embodiments, the data rate delivered to receiver system 250 is typically lower than spatially multiplexed MIMO communication systems 200. These embodiments provide robustness and reliability of the communication channel. In transmit diversity systems each of the signals transmitted from the transmitter system antennas 224a through 224t will experience a different interference environment (e.g., fading, reflection, multi-path phase shifts). In these embodiments, the different signal characteristics received at the receiver system antennas 252a through 254r are useful in determining the appropriate data stream. In these embodiments, the rank indicator is typically set to 1, telling the transmitter system 210 not to use spatial multiplexing.

Other embodiments may utilize a combination of spatial multiplexing and transmit diversity. For example in a MIMO communication system 200 utilizing four transmitter system antennas 224a through 224t, a first data stream may be transmitted on two of the transmitter system antennas 224a through 224t and a second data stream transmitted on remaining two transmitter system antennas 224a through 224t. In these embodiments, the rank index is set to an integer lower than the full rank of the precode matrix, indicating to the transmitter system 210 to employ a combination of spatial multiplexing and transmit diversity.

At the transmitter system 210, the modulated signals from the receiver system 250 are received by the transmitter system antennas 224a through 224t, are conditioned by the transmitter system transceivers 222a through 222t, are demodulated by a transmitter system demodulator 240, and are processed by the RX data processor 242 to extract the reserve link message transmitted by the receiver system 250. In some embodiments, the processor 230 of the transmitter system 210 then determines which pre-coding matrix to use for future forward link transmissions, and then processes the extracted message. In other embodiments, the processor 230 uses the received signal to adjust the beamforming weights for future forward link transmissions.

In other embodiments, a reported CSI can be provided to the processor 230 of the transmitter system 210 and used to determine, for example, data rates as well as coding and modulation schemes to be used for one or more data streams. The determined coding and modulation schemes can then be provided to one or more transmitter system transceivers 222a through 222t at the transmitter system 210 for quantization and/or use in later transmissions to the receiver system 250. Additionally and/or alternatively, the reported CSI can be used by the processor 230 of the transmitter system 210 to generate various controls for the TX data processor 214 and the TX MIMO processor 220. In one example, the CSI and/or other information processed by the RX data processor 242 of the transmitter system 210 can be provided to a data sink (not shown).

In some embodiments, the processor 230 at the transmitter system 210 and the processor 270 at the receiver system 250 may direct operations at their respective systems. Additionally, a memory 232 at the transmitter system 210 and a memory 272 at the receiver system 250 can provide storage for program codes and data used by the transmitter system processor 230 and the receiver system processor 270, respectively. Further, at the receiver system 250, various processing techniques can be used to process the $N_R$ received signals to detect the $N_T$ transmitted symbol streams. These receiver processing techniques can include spatial and space-time receiver processing techniques, which can include equalization techniques, "successive nulling/equalization and interference cancellation" receiver processing techniques, and/or "successive interference cancellation" or "successive cancellation" receiver processing techniques.

In proposed LTE Advanced (LTE-A) systems, a user equipment (UE) may be configured for operation in a carrier aggregation (CA) environment, where the UE may transmit and receive on multiple component carriers associated with one or more serving cells (the pairing of a downlink component carrier and an uplink component carrier may be referred to herein as a "cell"). One uplink component carrier may be configured (e.g., semi-statically) by higher layers in the LTE-A system (e.g., Layer 2 or Layer 3) as the primary component carrier (PCC). All other component carriers are configured as secondary component carriers (SCC). The PUCCH for a given UE will be carried on the PCC.

The existing PUCCH formats defined for LTE Rel-8 do not support the number of HARQ ACK/NAK bits that will be required (up to 2 for each component carrier) and the power control algorithms in LTE Rel-8 do not address the different quality of service (QoS) requirements (e.g., bit error rates) for the different types of uplink control information (UCI) that is carried in the PUCCH.

For the Rel-8 PUCCH, transmission power in subframe i is defined by:

$$P_{PUCCH}(i) = \min\{P_{CMAX}, P_{0\_PUCCH} + PL + h(n_{CQI}, n_{HARQ}) + \Delta_{F\_PUCCH}(F) + g(i)\}$$

Where $P_{CMAX}$ is the configured UE transmitter power and $P_{0\_PUCCH}$ is a parameter composed of the sum of a cell specific parameter $P_{O\_NOMINAL\_PUCCH}$ provided by higher layers and a UE specific component $P_{O\_UE\_PUCCH}$ provided by higher layers.

The parameter g(i) is an accumulative power control command for the PUCCH, where $$g(i) = g(i-1) + \sum_{m=0}^{M-1} \delta_{PUCCH}(i - k_m),$$

where g(i) is the PUCCH power control adjustment state in subframe (i), and where $\delta_{PUCCH}$ is a UE specific correction value that is included in the physical downlink control channel (PDCCH) with DCI formats 1A/1B/1D/1/2A/2 for a specific UE, or with DCI formats 3 and 3A for multiple UEs.

The parameter $\Delta_{F\_PUCCH}(F)$ is provided by higher layers and each $\Delta_{F\_PUCCH}(F)$ value corresponds to a PUCCH format (F) relative to PUCCH format 1a, where each PUCCH format is defined in Table I below.

TABLE I

| PUCCH format | Information | Number of bits per subframe | Number of CQI bits per subframe |
| --- | --- | --- | --- |
| 1 | SR | N/A | 0 |
| 1a | 1-bit HARQ | 1 | 0 |
| 1b | 2-bit HARQ | 2 | 0 |
| 2 | CQI | 20 | ≤11 |
| 2a | CQI + 1-bit HARQ | 21 | ≤11 |
| 2b | CQI + 2-bit HARQ | 22 | ≤11 |

The parameter h(n) is a PUCCH format dependent closed-loop function where $n_{CQI}$ corresponds to the number of information bits (if any) allocated to channel quality information in the PUCCH format and $n_{HARQ}$ is the number of HARQ bits (if any). For PUCCH format 1, 1a and 1b, $h(n_{CQI}, n_{HARQ}) = 0$. For PUCCH format 2, 2a and 2b and a normal cyclic prefix, $h(n_{CQI}, n_{HARQ}) = 10 \log_{10}(n_{CQI}/4)$ if $n_{CQI} \geq 4$; otherwise $h(n_{CQI}, n_{HARQ}) = 0$. For PUCCH format 2 and an extended cyclic prefix, $h(n_{CQI}, n_{HARQ}) = 10 \log_{10}[(n_{CQI} + n_{HARQ})/4]$ if $n_{CQI} + n_{HARQ} \geq 4$; otherwise $h(n_{CQI}, n_{HARQ}) = 0$.

It will be appreciated that h(n) is responsive only to the total number of CQI bits or the total number of CQI and HARQ bits (i.e., it does not distinguish between CQI and HARQ bits), and that $\Delta_{F\_PUCCH}(F)$ depends on the PUCCH format and not on the number of CQI bits and/or HARQ bits.

For a system with carrier aggregation, one or more new PUCCH formats may be defined that accommodate the greater number of HARQ ACK/NAK bits associated with multiple component carriers, and we may also define new open-loop and closed loop power control parameters that account for the relative number of HARQ bits, which require more power for higher reliability, and CQI bits that require relatively less power due to lower reliability requirements (e.g., HARQ ACK/NAK bits may require a bit-error rate (BER) that is less than $10^{-3}$ while the system may tolerate a BER for CQI bits as high as $10^{-1}$).

In some of the following description, an exemplary carrier aggregation system with five component carriers is assumed for ease of discussion. It will be appreciated that contemplated embodiments are not so limited and may include less than five component carriers or more than five component carriers.

In one embodiment, in a carrier aggregation system, a new PUCCH format may be defined (or existing formats such as 2/2a/2b may be redefined) to carry HARQ ACK/NAK bits for multiple downlink component carriers without CQI bits, or CQI bits without HARQ bits. For example, in the case of five component carriers, a new PUCCH format may be defined to carry up to 10 HARQ ACK/NAK bits (2 per carrier) for a frequency division multiplexing (FDD) system. More HARQ ACK/NAK bits may also be supported for a time-division multiplexing (TDD) system. In such a case, the open-loop parameter $\Delta_{F\_PUCCH}(F)$ may be individually defined to account for the higher transmit power associated with the lower BER required for HARQ ACK/NAK bits. Additionally or separately, the closed-loop parameter h(n) may be defined to account for the number of HARQ ACK/NAK bits rather than the number of CQI bits or the total number of HARQ ACK/NAK and CQI bits. For example, h could be defined as $h(nHARQ)=10\log_{10}(n_{HARQ}/2)$, implicitly weighting HARQ bits over CQI bits, e.g., in LTE Rel-8, by ~3 dB. In this exemplary embodiment, the eNodeB can inherently distinguish the two different payloads (HARQ and CQI) because HARQ reporting on the uplink is synchronous and the eNodeB knows when to expect HARQ responses.

In another embodiment, a new PUCCH format may be defined that carries HARQ ACK/NAK bits for multiple component carriers and CQI bits (and possibly other information such as RI and PMI). In this embodiment, a new open-loop power control parameter $\Delta_{F\_PUCCH}$ may be defined that accounts for the mixture of HARQ ACK/NAK bits and CQI bits. As an example, the mixture can be represented by the relative number of HARQ ACK/NAK bits and CQI bits. For example, $\Delta_{F\_PUCCH}$ may be defined as $\Delta_{F\_PUCCH} = f(n_{HARQ}, n_{CQI}) = f\{n_{HARQ}/(n_{HARQ}+n_{CQI})\}$. The function $f(n_{HARQ}, n_{CQI})$ may be a continuous function or a discrete function. For example, $f(n_{HARQ}, n_{CQI})$ may be defined as:

$$f(n_{HARQ}, n_{CQI}) = P_1 \text{ if } \frac{n_{HARQ}}{n_{CQI}} \leq \frac{1}{4}$$

$$f(n_{HARQ}, n_{CQI}) = P_2 \text{ if } \frac{1}{4} < \frac{n_{HARQ}}{n_{CQI}} \leq \frac{1}{2}$$

$$f(n_{HARQ}, n_{CQI}) = P_3 \text{ if } \frac{1}{2} < \frac{n_{HARQ}}{n_{CQI}} \leq \frac{3}{4}$$

$$f(n_{HARQ}, n_{CQI}) = P_4 \text{ if } \frac{3}{4} < \frac{n_{HARQ}}{n_{CQI}}$$

where $P_4 > P_3 > P_2 > P_1$. It will be appreciated that other functions may be selected to reflect a need for increasing PUCCH power as the relative number of HARQ ACK/NAK bits increases.

Similarly, in one exemplary embodiment, a new closed-loop power control parameter $f'(n)$ may be defined to replace $h(n)$ in the power control equation that also accounts for the relative number of HARQ ACK/NAK bits and CQI bits. For example, $f'(n)$ may be defined as $f'(k \cdot n_{HARQ} + n_{CQI})$ where the constant k is a scale factor related to the number of HARQ ACK/NAK bits relative to the number of CQI bits. For example, $f'(n)$ may be defined as:

$$f'(k \cdot n_{HARQ} + n_{CQI}) = 10\log_{10}(k_1 \cdot n_{HARQ} + n_{CQI}) \text{ if } \frac{n_{HARQ}}{n_{CQI}} \leq \frac{1}{4}$$

$$f'(k \cdot n_{HARQ} + n_{CQI}) = 10\log_{10}(k_2 \cdot n_{HARQ} + n_{CQI}) \text{ if } \frac{1}{4} < \frac{n_{HARQ}}{n_{CQI}} \leq \frac{1}{2}$$

$$f'(k \cdot n_{HARQ} + n_{CQI}) = 10\log_{10}(k_3 \cdot n_{HARQ} + n_{CQI}) \text{ if } \frac{1}{2} < \frac{n_{HARQ}}{n_{CQI}} \leq \frac{3}{4}$$

$$f'(k \cdot n_{HARQ} + n_{CQI}) = 10\log_{10}(k_4 \cdot n_{HARQ} + n_{CQI}) \text{ if } \frac{3}{4} < \frac{n_{HARQ}}{n_{CQI}}$$

where $k_4 > k_3 > k_2 > k_1$. It will be appreciated that other functions may be selected to reflect a need for increasing PUCCH power as the relative number of HARQ ACK/NAK bits increases.

Figure 3:
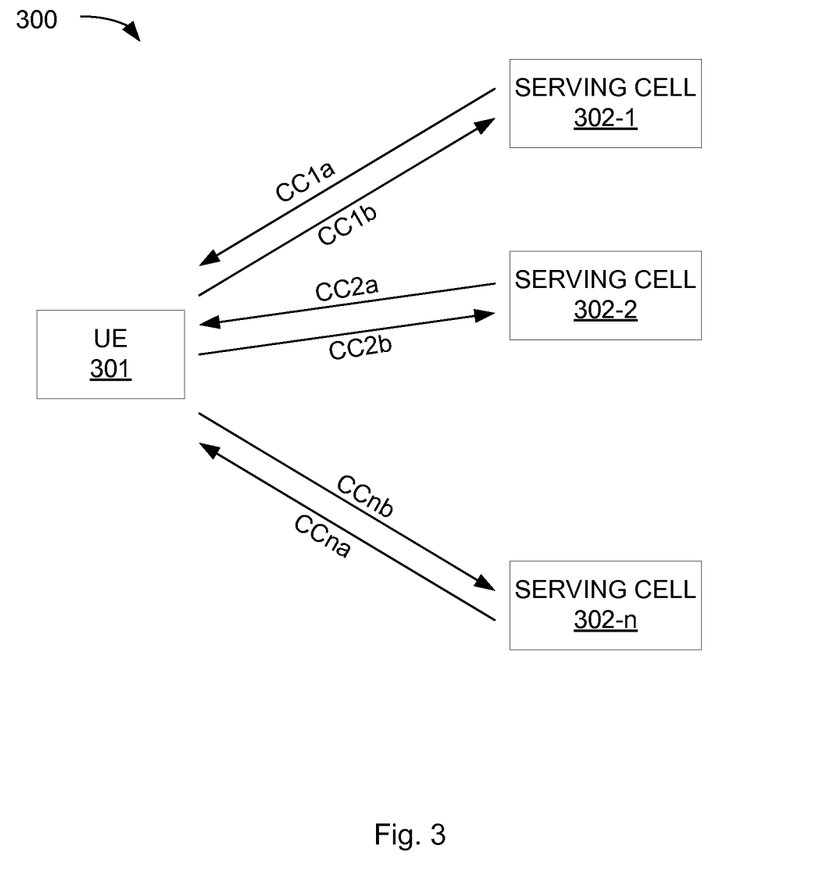
FIG. 3 is a block diagram illustrating an exemplary carrier aggregation system.

FIG. 3 is a block diagram illustrating a wireless communication system 300 with carrier aggregation. In system 300, user equipment (UE) 301 is configured to operate with multiple component carriers. UE 301 may receive downlink component carrier CC1a from serving cell 302-1 and downlink component carriers CC2a through CCna from serving cells 302-2 through 302-n, respectively. Similarly, UE 301 may transmit uplink component carriers CC1b, CC2b through CCnb to serving cells 302-1 through 302-n, respectively. In one embodiment, all of the uplink and downlink component carriers may be received and transmitted by a single serving cell.

In one embodiment, a user equipment such as UE 301 may select control information to be transmitted in an uplink control channel (e.g., PUCCH) format in a component carrier of a plurality of component carriers, where the control information includes information types associated with different information reliability requirements (e.g., HARQ ACK/NAK and/or CQI). The UE may generate at least one of an open-loop power control parameter (e.g., $f(n_{HARQ}, n_{CQI})$) and a closed-loop power control parameter (e.g., $f'(k \cdot n_{HARQ} + n_{CQI})$) based on the information types. The UE may then transmit the control information in the uplink control channel format at a power level determined by at least one of the open-loop power control parameter and the closed-loop power control parameter.

In one embodiment, a first information type includes channel quality information (CQI) for the plurality of component carriers and a second information type includes acknowledgment/negative acknowledgment (ACK/NAK) information for the plurality of component carriers.

In one embodiment, the open-loop power control parameter comprises a first function of a number of ACK/NAK bits for the plurality of component carriers and a number of CQI bits for the plurality of component carriers, and wherein the closed-loop power control parameter comprises a second function of the number of ACK/NAK bits for the plurality of component carriers and the number of CQI bits for the plurality of component carriers.

In one embodiment, the first function depends on a ratio of the number of ACK/NAK bits for the plurality of component carriers to the number of CQI bits for the plurality of component carriers. In another embodiment, the second function depends on a ratio of the number of ACK/NAK bits for the plurality of component carriers to the number of CQI bits for the plurality of component carriers.

In another embodiment, the plurality of component carriers includes a primary component carrier (PCC) and one or more secondary component carriers (SCC), where the UE transmit the control information on a physical uplink control channel (PUCCH) in the primary component carrier.

Figure 4:
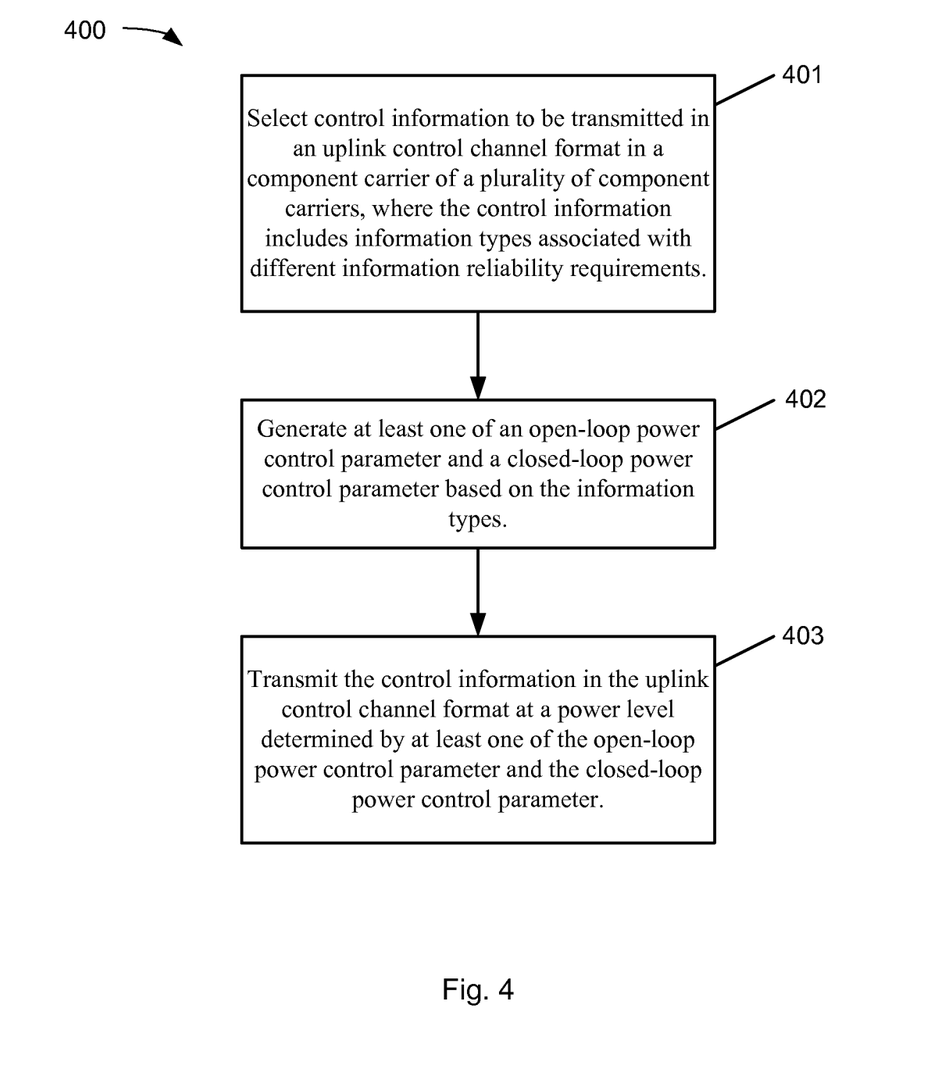
FIG. 4 is a flowchart illustrating an exemplary method.

FIG. 4 is a flowchart 400 illustrating an exemplary method in a user equipment. The method begins at operation 401, where user equipment selects control information to be transmitted in an uplink control channel format in a component carrier of a plurality of component carriers, where the control information includes information types associated with different information reliability requirements. The method continues at operation 402, where the UE generates at least one of an open-loop power control parameter and a closed-loop power control parameter based on the information types. At operation 403, the UE transmits the control information in the uplink control channel format at a power level determined by at least one of the open-loop power control parameter and the closed-loop power control parameter.

Figure 5:
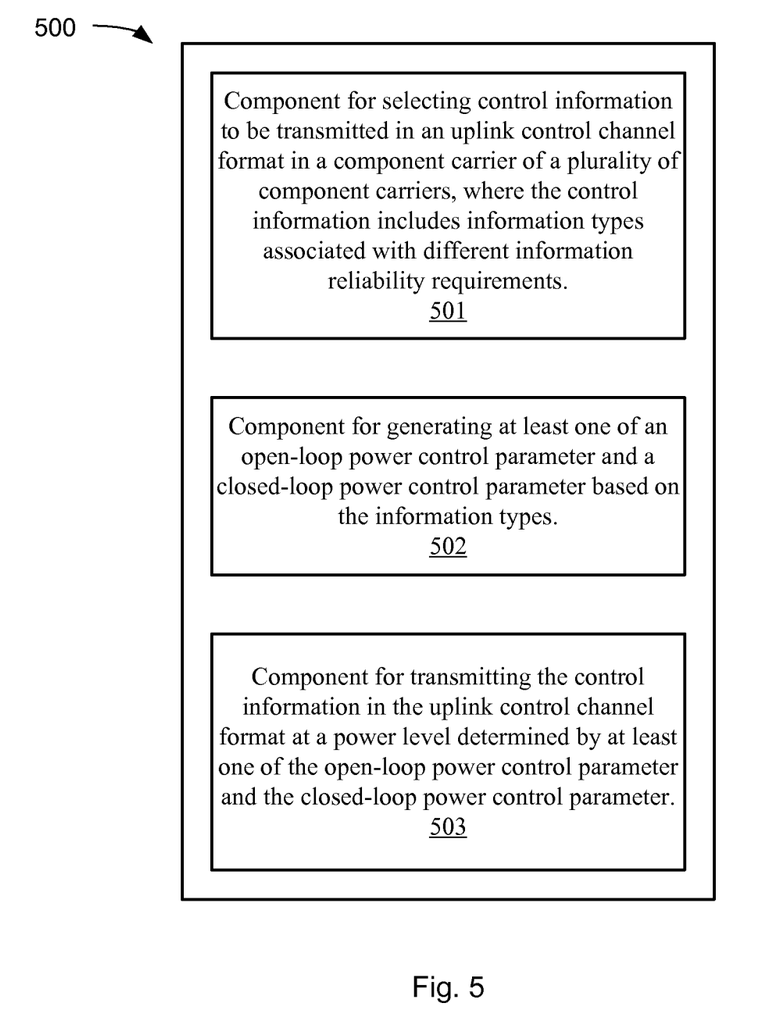
FIG. 5 is a functional block diagram illustrating an exemplary user equipment.

FIG. 5 is a functional block diagram illustrating a user equipment 500 capable of supporting the various operations and embodiments described herein. User equipment 500 includes a component 501 for selecting control information to be transmitted in an uplink control channel format in a component carrier of a plurality of component carriers, where the control information includes information types associated with different information reliability requirements. User equipment 500 also includes a component 502 for generating at least one of an open-loop power control parameter and a closed-loop power control parameter based on the information types. User equipment 500 also includes a component 503 for transmitting the control information in the uplink control channel format at a power level determined by at least one of the open-loop power control parameter and the closed-loop power control parameter.

Figure 6:
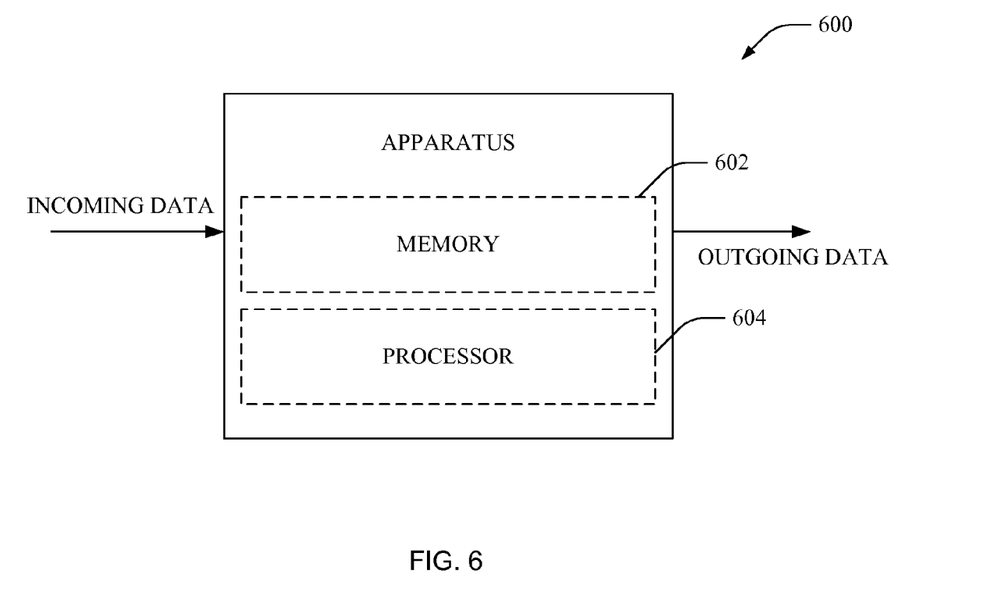
FIG. 6 is an exemplary apparatus capable of implementing various embodiments.

FIG. 6 illustrates an apparatus 600 (e.g., a communications apparatus) within which the various disclosed embodiments may be implemented. In particular, the apparatus 600 that is shown in FIG. 6 may comprise at least a portion of a serving cell such as serving cells 302 illustrated in FIG. 3 and/or at least a portion of a user equipment such as UE 301 illustrated in FIG. 3 and/or at least a portion of a transmitter system or a receiver system such as the transmitter system 210 and the receiver system 250 that are depicted in FIG. 2. The apparatus 600 can be resident within a wireless network and receive incoming data via, for example, one or more receivers and/or the appropriate reception and decoding circuitry (e.g., antennas, transceivers, demodulators and the like). The apparatus 600 can also transmit outgoing data via, for example, one or more transmitters and/or the appropriate encoding and transmission circuitry (e.g., antennas, transceivers, modulators and the like). Additionally, or alternatively, the apparatus 600 may be resident within a wired network.

The apparatus 600 can include a memory 602 that can retain instructions for performing one or more operations, such as signal conditioning, analysis and the like. Additionally, the apparatus 600 may include a processor 604 that can execute instructions that are stored in the memory 602 and/or instructions that are received from another device. The instructions can relate to, for example, configuring or operating the apparatus 600 or a related communications apparatus. It should be noted that while the memory 602 that is depicted in FIG. 6 is shown as a single block, it may comprise two or more separate memories that constitute separate physical and/or logical units. In addition, the memory 602, while being communicatively coupled to the processor 604, may reside fully or partially outside of the apparatus 600. It is also to be understood that one or more components, such as the serving cells 302 depicted in FIG. 3 can exist within a memory such as memory 602.

It will be appreciated that the memories that are described in connection with the disclosed embodiments can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM) or flash memory. Volatile memory can include random access memory (RAM), which may act as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM) and direct Rambus RAM (DRRAM).

It should also be noted that the apparatus 600 of FIG. 6 can be employed as a user equipment/mobile device, and can be, for instance, a module such as an SD card, a network card, a wireless network card, a computer (including laptops, desktops, personal digital assistants PDAs), mobile phones/smart phones or any other suitable terminal that can be utilized to access a network. The user equipment accesses the network by way of an access component (not shown). In one example, a connection between the user equipment and the access components may be wireless in nature, in which access components may be the base station and the user equipment is a wireless terminal. For instance, the terminal and base stations may communicate by way of any suitable wireless protocol, including but not limited to Time Divisional Multiple Access (TDMA), Code Division Multiple Access (CDMA), Frequency Division Multiple Access (FDMA), Orthogonal Frequency Division Multiplexing (OFDM), FLASH OFDM, Orthogonal Frequency Division Multiple Access (OFDMA) or any other suitable protocol.

Access components can be an access node associated with a wired network or a wireless network. To that end, access components can be, for instance, a router, a switch and the like. The access component can include one or more interfaces, e.g., communication modules, for communicating with other network nodes. Additionally, the access component can be a base station (or wireless access point) in a cellular type network, wherein base stations (or wireless access points) are utilized to provide wireless coverage areas to a plurality of subscribers. Such base stations (or wireless access points) can be arranged to provide contiguous areas of coverage to one or more cellular phones and/or other wireless terminals.

It is to be understood that the embodiments and features that are described herein may be implemented by hardware, software/firmware or any combination thereof. Various embodiments described herein are described in the general context of methods or processes, which may be implemented in one embodiment by a computer program product, embodied in a computer-readable medium, including computer-executable instructions, such as program code, executed by computers in networked environments. As noted above, a memory and/or a computer-readable medium may include removable and non-removable storage devices including, but not limited to, Read Only Memory (ROM), Random Access Memory (RAM), compact discs (CDs), digital versatile discs (DVD) and the like. When implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor.

Also, any connection is properly termed a computer-readable medium. If, for example, software is transmitted from a website, server, or other remote source using a coaxial cable, fiber optic cable, twisted pair, digital subscriber line (DSL), then the coaxial cable, fiber optic cable, twisted pair or DSL are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Generally, program modules may include routines, programs, objects, components, data structures, etc., that perform particular tasks or implement particular abstract data types. Computer-executable instructions, associated data structures and program modules may represent examples of program code for executing steps of the methods disclosed herein. The particular sequence of such executable instructions or associated data structures represents examples of corresponding acts for implementing the functions described in such steps or processes.

The various illustrative logic, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, etc. or any combination thereof designed to perform the functions described herein. A general-purpose processor may be a microprocessor, but, in the alternative, the processor may be any conventional processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

For a software/firmware implementation, the techniques described herein may be implemented with modules (e.g., procedures, functions and so on) that perform the functions described herein. The program codes may be stored in memory units and executed by processors. The memory unit may be implemented within the processor and/or external to the processor, in which case it can be communicatively coupled to the processor through various means as is known in the art.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., user equipment-to-user equipment) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed embodiments. SC-FDMA has similar performance and essentially a similar overall complexity as those of OFDMA systems. SC-FDMA signal has lower peak-to-average power ratio (PAPR) because of its inherent single carrier structure. SC-FDMA can be utilized in uplink communications where lower PAPR can benefit a user equipment in terms of transmit power efficiency.

Moreover, various aspects or features described herein may be implemented as a method, apparatus or article of manufacture using standard programming and/or engineering techniques. The term "article of manufacture" as used herein is intended to encompass a computer program accessible from any computer-readable device, carrier or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, media capable of storing, containing, and/or carrying instruction(s) and/or data.

Further, the steps and/or actions of a method or algorithm described in connection with the aspects disclosed herein may be embodied directly in hardware, in a software/firmware module executed by a processor, or in a combination of the two. A software/firmware module may reside in RAM memory, flash memory, ROM memory, EPROM memory, EEPROM memory, a hard disk, a removable disk, a CD-ROM, a DVD, or any other form of suitable storage medium. An exemplary storage medium may be coupled to the processor, such that the processor can read information from, and write information to, the storage medium. In the alternative, the storage medium may be integral to the processor. Further, in some embodiments, the processor and the storage medium may reside in an ASIC. Additionally, the ASIC may reside in a user equipment. In the alternative, the processor and the storage medium may reside as discrete components in a user equipment. Additionally, in some embodiments, the steps and/or actions of a method or algorithm may reside as one or any combination or set of codes and/or instructions on a machine readable medium and/or computer readable medium, which may be incorporated into a computer program product.

While the foregoing disclosure discusses illustrative embodiments, it should be noted that various changes and modifications could be made herein without departing from the scope of the described embodiments as defined by the appended claims. Accordingly, the described embodiments are intended to embrace all such alterations, modifications and variations that fall within scope of the appended claims. Furthermore, although elements of the described embodiments may be described or claimed in the singular, the plural is contemplated unless limitation to the singular is explicitly stated. Additionally, all or a portion of any embodiment may be utilized with all or a portion of any other embodiments, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method of operating a user equipment, comprising:
   selecting control information to be transmitted in an uplink control channel format in a component carrier of a plurality of component carriers, the control information comprising information types associated with different information reliability requirements, wherein a first information type comprises channel quality indicator (CQI) for the plurality of component carriers and wherein a second information type comprises acknowledgment (ACK) or negative acknowledgment (NAK) information for the plurality of component carriers;
   generating at least one of an open-loop power control parameter or a closed-loop power control parameter based at least in part on a number of ACK bits or NAK bits for the plurality of component carriers, a number of CQI bits for the plurality of component carriers, and a ratio of the ACK bits or the NAK bits to the CQI bits; and
   transmitting the control information in the uplink control channel format at a power level determined by at least one of the open-loop power control parameter or the closed-loop power control parameter;
      wherein the generating the at least one of the open-loop power control parameter or the closed-loop power control parameter is based at least in part on a comparison of the ratio of the ACK bits or the NAK bits to the CQI bits with a threshold.

2. The method of claim 1, wherein the open-loop power control parameter comprises a first function of the number of ACK or NAK bits for the plurality of component carriers and the number of CQI bits for the plurality of component carriers.

3. The method of claim 1, wherein the plurality of component carriers comprises a primary component carrier (PCC) and at least one secondary component carrier (SCC), and wherein transmitting the control information comprises transmitting on a physical uplink control channel (PUCCH) in the primary component carrier.

4. An apparatus, comprising:
   a memory unit; and
   at least one processor coupled to the memory unit, the at least one processor configured:
   to select control information to be transmitted in an uplink control channel format in a component carrier of a plurality of component carriers, the control information comprising information types associated with different information reliability requirements, wherein a first information type comprises channel quality indicator (CQI) for the plurality of component carriers and wherein a second information type comprises acknowledgment (ACK) or negative acknowledgment (NAK) information for the plurality of component carriers;
   to generate at least one of an open-loop power control parameter or a closed-loop power control parameter based at least in part on a number of ACK bits or NAK bits for the plurality of component carriers, a number of CQI bits for the plurality of component carriers, and a ratio of the ACK bits or the NAK bits to the CQI bits; and
   to transmit the control information in the uplink control channel format at a power level determined by at least one of the open-loop power control parameter or the closed-loop power control parameter;
      wherein the at least one processor is configured to generate the at least one of the open-loop power control parameter or the closed-loop power control parameter based at least in part on a comparison of the ratio of the ACK bits or the NAK bits to the CQI bits with a threshold.

5. The apparatus of claim 4, wherein the open-loop power control parameter comprises a first function of the number of ACK or NAK bits for the plurality of component carriers and the number of CQI bits for the plurality of component carriers.

6. The apparatus of claim 4, wherein the plurality of component carriers comprises a primary component carrier (PCC) and at least one secondary component carrier (SCC), and wherein the at least one processor is further configured to transmit the control information on a physical uplink control channel (PUCCH) in the primary component carrier.

7. An apparatus configured as a user equipment, comprising:
   means for selecting control information to be transmitted in an uplink control channel format in a component carrier of a plurality of component carriers, the control information comprising information types associated with different information reliability requirements, wherein a first information type comprises channel quality indicator (CQI) for the plurality of component carriers and wherein a second information type comprises acknowledgment (ACK) or negative acknowledgment (NAK) information for the plurality of component carriers;
   means for generating at least one of an open-loop power control parameter or a closed-loop power control parameter based at least in part on a number of ACK bits or NAK bits for the plurality of component carriers, a number of CQI bits for the plurality of component carriers, and a ratio of the ACK bits or the NAK bits to the CQI bits; and means for transmitting the control information in the uplink control channel format at a power level determined by at least one of the open-loop power control parameter or the closed-loop power control parameter;

wherein the means for generating the at least one of the open-loop power control parameter or the closed-loop power control parameter include means for generating the at least one of the open-loop power control parameter or the closed-loop power control parameter based at least in part on a comparison of the ratio of the ACK bits or the NAK bits to the CQI bits with a threshold.

8. The apparatus of claim 7, wherein the open-loop power control parameter comprises a first function of the number of ACK or NAK bits for the plurality of component carriers and the number of CQI bits for the plurality of component carriers.

9. The apparatus of claim 7, wherein the plurality of component carriers comprises a primary component carrier (PCC) and at least one secondary component carrier (SCC), wherein the means for transmitting the control information comprises means for transmitting the control information on a physical uplink control channel (PUCCH) in the primary component carrier.

10. A computer program product for wireless communications, the computer program product comprising:

a non-transitory computer-readable medium having program code recorded thereon, the program code comprising:

program code to select control information to be transmitted in an uplink control channel format in a component carrier of a plurality of component carriers, the control information comprising information types associated with different information reliability requirements, wherein a first information type comprises channel quality indicator (CQI) for the plurality of component carriers and wherein a second information type comprises acknowledgment (ACK) or negative acknowledgment (NAK) information for the plurality of component carriers;

program code to generate at least one of an open-loop power control parameter or a closed-loop power control parameter based at least in part on a number of ACK bits or NAK bits for the plurality of component carriers, a number of CQI bits for the plurality of component carries, and a ratio of the ACK bits or the NAK bits to the CQI bits; and program code to transmit the control information in the uplink control channel format at a power level determined by at least one of the open-loop power control parameter or the closed-loop power control parameter;

wherein the program code to generate at least one of an open-loop power control parameter or a closed-loop power control parameter includes program code to generate at least one of an open-loop power control parameter or a closed-loop power control parameter based at least in part on a comparison of the ratio of the ACK bits or the NAK bits to the CQI bits with a threshold.

11. The computer program product of claim 10, wherein the open-loop power control parameter comprises a first function of the number of ACK or NAK bits for the plurality of component carriers and the number of CQI bits for the plurality of component carriers.

12. The computer program product of claim 10, wherein the plurality of component carriers comprises a primary component carrier (PCC) and at least one secondary component carrier (SCC), and wherein the program code further comprises program code to transmit the control information on a physical uplink control channel (PUCCH) in the primary component carrier.

* * * * *